United States Patent Office 3,493,024
Patented Feb. 3, 1970

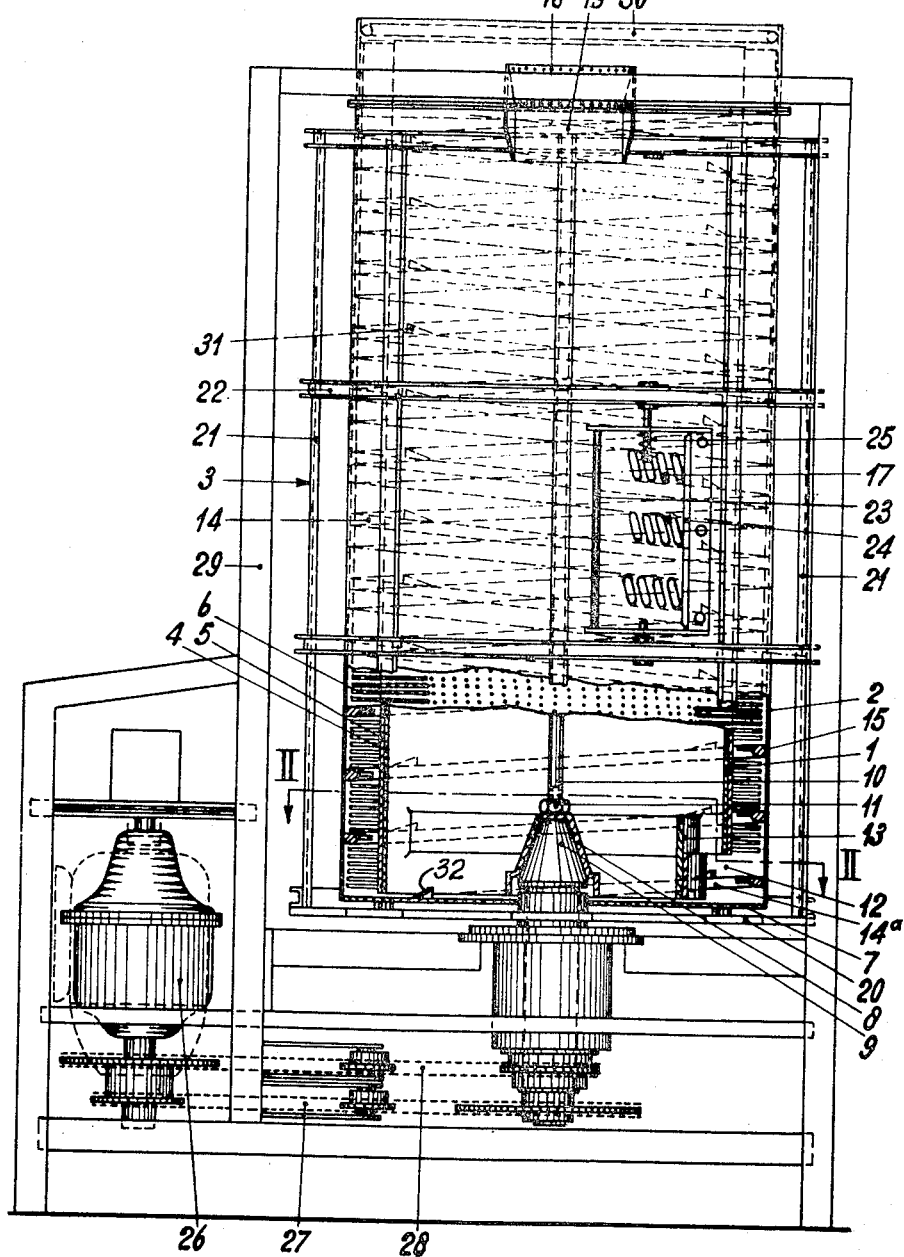

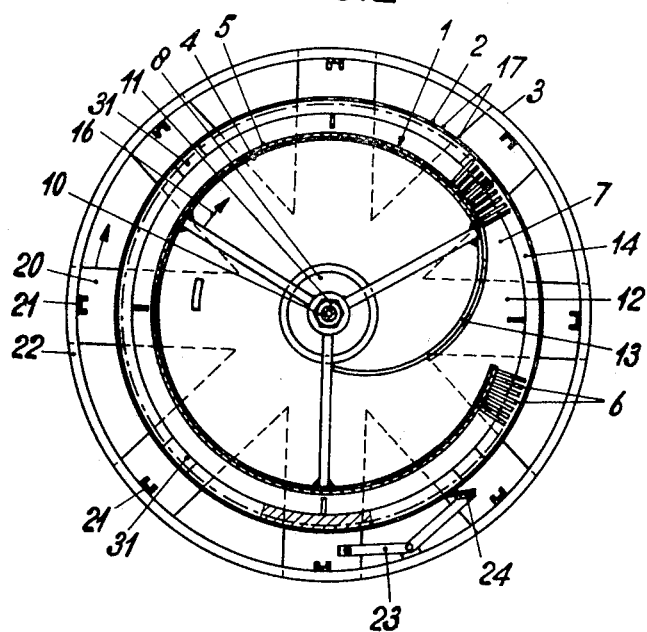

3,493,024
MACHINE FOR DECAPITATING AND TAILING OF SILVER-SKIN ONIONS
Albertus van Raay, Ulft, Netherlands, assignor to N.V. Machinefabriek Finis, Ulft, Netherlands, a limited-liability company of the Netherlands
Filed Nov. 20, 1967, Ser. No. 684,145
Int. Cl. A23n 7/00; B62d 1/28; A23p 1/00
U.S. Cl. 146—83                                   10 Claims

ABSTRACT OF THE DISCLOSURE

A vertically arranged machine for cutting off the heads and tails of silver-skin onions includes a vertical cylinder having helical slots cut therein and a helical track associated with the slot, an inner cylindrical casing with a plurality of elastic fingers to engage the onions and move them upwardly on said spiral track with the heads and tails of the onions from time to time extending through the helical slot. A knife blade rotates outside of the stationary cylinder to cut off any portion of the onion which extends therethrough. The inner cylindrical casing and the means moving the knives are rotated at slightly different angular velocities. A recess at the top of the stationary cylinder provides an outlet for the processed onions.

BACKGROUND OF THE INVENTION

Means for peeling onions such as those known to the prior art are provided with a plate with knives movable in a horizontal plane, a superimposed member also movable in a horizontal plane for guiding the onions to be treated and movable in the same direction as the plate with knives, and a plate with slots lying between the plate with knives and the guide member. The guiding member lying above the plate is provided with members to rotate the onions along the slotted plate under slight pressure and thus increase the chance that the heads and the tails of the onions protrude through the slots where they can be then cut off by the knives. One such machine is decribed in United States Patent No. 949,454, and a slightly varying construction of the members of the upper plate is disclosed in Dutch patent specification 91,095. With such prior art devices, it appears that silver-skin onions, and especially salted silver-skin onions, are so slippery that only a very small percentage are decapitated or tailed during a rotation of the flat guiding member. Moreover, the onions are driven outwardly by the rotation of the guiding member and practice has shown that several rotations of the guiding member are necessary to decapitate and tail at least a part of the onions.

Prior art attempts to improve the operation include imposing a helical edge perpendicular to the plane of the flat member to provide a longer path for travel and to guide the onions to their travel from the supply side of the slotted plate to the discharge of the slotted plate which is located in the center. With such devices, a path of about six meters at the maximum for the onions to travel has been obtained. However, this distance appears to be far too short and in practice a second machine, and in some cases even a third machine have been mounted in series with the first machine to decapitate and tail a substantial part of the onions in a single load. With such a series arrangement, the onions may travel a distance of from twelve to eighteen meters during processing.

A second disadvantage in the prior art machine is in the fact that the knives, when engaging pebbles or such passing through the slots in the flat member, will quickly become blunt and may even break, which requires demounting of the entire knife carrying plate which will have to be provided with a number of new knives or replaced in its entirety.

In order to give some insight in the expenses incurred in the machine assembly described above, attention is drawn to the fact that an entire crop of onions must be treated within a very short time, that is, within a few weeks. The generally pregraded, washed, and sometimes salted onions are supplied on a conveyor belt which divided the onions among some ten processing stations. As already outlined above, each onion must pass through two or more machines of the type described in order to decapitate a substantial part of the lot. This means that twenty or thirty machines of the type including guide spirals must be installed at each station. These machines are not oniy expensive themselves, but much time is lost with repairs and substitutions so that the efficiency of this operation is considerably reduced.

As a matter of fact, the problem of decapitating and tailing of silver-skin onions has not yet been solved satisfactorily since it was hitherto deemed impossible to decapitate and tail salted silver-skin onions mechanically without a prohibitive large number of waste onions.

It must be observed that the decapitating and tailing of larger onions does not present such problems and that machines, such as the machines described in the applicant's Dutch patent application Ser. No. 285,343, laid out for public inspection on Feb. 10, 1965, decapitates and tails with great velocity and with a minimum of waste such larger onions in an absolutely satisfactory manner even if there is a great difference in the size of the onions processed, that is to say when the onions have not, or have only to a slight degree, been graded beforehand.

SUMMARY OF THE INVENTION

The invention herein described now presents a solution for the problem of decapitating and tailing smaller silver-skin onions, which may or may not be salted, in which all of the described disadvantages have been prevented. The machine for decapitating and tailing silver-skin onions according to this invention is characterized in that the machine has a perpendicular rotatable inner cylindrical casing into which onions are introduced and which is provided with very elastic pins or other similar means at its outer side. A stationary, vertical cylinder is mounted concentric with the inner cylindrical casing and closely encloses the elastic pins. A slot like aperture provided at the underside of the cylindrical casing permits the passage of the onions to the annular space formed between the cylindrical casing and the stationary cylinder. The vertical stationary cylinder supports an upward helical path of slight pitch upon which the onions are pushed upwardly by the elastic pins. The cylinder also includes helical slots located immediately above the helical path through which the heads and tails of the onions may protrude. Outside the stationary vertical cylinder is a rotatable knife frame with knives arranged for cutting off the heads and tails of the onions which protrude through such slots. The top of the stationary vertical cylinder includes a recess to discharge the processed onions.

Because of the vertical disposition of the machine, the onions can, without difficulty be made to travel a distance of twenty meters or more, so that for each conveyor belt which effects a division of the supplied onions, for example in ten lots via ten sub-conveyor belts, only ten machines are needed as opposed to the twenty or thirty machines of the prior art type. Moreover, the vertically arranged machines of this invention take up only a small floor space as compared with the horizontal machines known to the prior art.

As the onions are pushed upwardly on the helical path by the cooperation of the elastic pins on the inner cylindrical casing, they travel the entire distance of approxitely twenty meters. The cut off heads and tails of the
ions are easily removed by squirting water from outside
inst the stationary vertical cylinder. The knives, which
ve been preferably mounted resiliently, rotate with a
ocity which is slightly higher than that of the inner cy-
drical casing so that the knives, so to speak, overtake
: onions. As the slots in the stationary cylinder are pref-
ibly inclined, the risk of damaging the resiliently
)unted knives is substantially reduced while the sub-
tution of a knife, should it become damaged or dulled,
very easy since it is positioned at the exterior of the ma-
ine and the entire knife plate need not be detached as
 the case of United States Patent No. 949,454, and
itch patent specification 91,095.

Another advantage is that the velocities of the knives, as
·ll as the velocity of the rotating inner cylindrical cas-
3, can be adjusted with respect to each other, depending
 the kind of onions being processed, that is, salted or
·t, graded or not, sized, etc.

Furthermore, the helical path includes spaced check
embers mounted thereon which increases the revolving
ovement of the onions and so increases the chance that
e heads or tails thereof pass through a slot and there be
t off. Still an additional advantage lies in the fact that
ere is only one feeding device from the conveyor belt
id one discharge outlet to the grading device, washing
achine, or even directly into the packaging machine, in
intradistinction to the double or triple machine arrange-
ent of the prior art when using horizontally arranged
achines.

As the onions are fed from the top towards the interior
: the space formed by the inner cylindrical casing, there
ill be no risk of the feeding mechanism being stopped up,
; often happens in horizontal machines of the prior art.

A test machine having a spiral length of twenty-two
eters has demonstrated that 300 kg. of onions per hour
)uld be entirely decapitated and tailed with practically no
aste.

While the pushing force in the horizontal machines of
ie prior art operates from above, that is in a direction
ractically perpendicular to the horizontal guiding plate,
iis pushing force, in a machine constructed according to
iis invention, is directed tangentially which prevents
·ushing of the soft onions, especially salted onions being
:ry vulnerable in this respect.

The inner cylindrical casing has a narrow horizontal
perture having only a slight vertical height formed to-
ether with a check plate on the bottom of the cylindrical
ising to push the onions supplied to the interior of the
ylindrical casing outwardly and up the helical path. This
rovides a further advantage since it is immaterial to what
xtent the inner cylindrical casing is filled since the onions
re moved onto the helical path at a specified rate and that
n irregular input of onions to the interior of the cylin-
rical casing is not objectionable. In the horizontal ma-
hines of the prior art, however, a steady supply of onions
; of the greatest importance.

BRIEF DESCRIPTION OF THE DRAWINGS

This invention is further elucidated by the description
if the drawings of a preferred embodiment of the machine
onstructed according to this invention.

In the drawings—

FIG. 1 is an elevational view in which the lower part
if the stationary cylinder and of the inner cylindrical
asing have been cut away and shown in cross section; and FIG. 2 is a cross sectional view taken along line 2—2
n FIG. 1.

DETAILED DESCRIPTION OF THE INVENTION

The machine shown in FIGS. 1 and 2 consists chiefly
ind principally of three parts, the rotatable inner cylin-
lrical casing 1, the stationary vertical cylinder 2, and the
otatable knife-frame 3.

The inner cylindrical casing 1 consists of a cylindrical
body 4 having an outer coating of rubber, or other similar
material, with the coating 5 having a great number of pri-
mary horizontally disposed elastic pins 6, also of rubber.
For the purpose of clarity, only a few of these pins are
shown in FIG. 2. The inner cylindrical casing 1 is open
at the bottom and is positioned above the bottom 7 of the
stationary cylinder 2. A socket 8 is centrally located of
the cylindrical body 4 and connected thereto by three sup-
ports and is positioned at its bottom for mounting on the
pivot 9 of the drive shaft 10 by the aid of screw 11.

An aperture 12 is located at the lower portion of the
cylindrical body 4 and immediately thereabove is a spiral
strip 13 which consists partly of the inwardly bent part
of the cylinder 4 which includes the rubber coating 5 and
an uncoated portion.

The stationary cylinder 2 has one or more checking
members which assist in bringing the onions taken along
the spiral 13 outside through the opening 12 and onto
the lowest convolution of the helical path 14 of the sta-
tionary cylinder 2, the details of which will be discussed
hereinafter.

The stationary cylinder 2 is positioned outside the inner
cylinder casing and has a diameter such that the pins 6
of the inner cylindrical casing 1 almost touch it. A helical
path 14 is arranged perpendicular to and on the inner side
of cylinder 2 and has a horizontal cross section which
runs to almost half the distance to the outer side of the
inner cylindrical casing 1 (FIG. 2). The stationary cyl-
inder 2 has here and there several rigid pins running radi-
ally almost to the outer side of the inner cylindrical casing
1 for the purpose of cleaning the elastic pins 6. As is shown
clearly in FIG. 1, the length of the helical path 14 is
considerable since it makes a great many convolutions
within the stationary cylinder 2. The helical path 14 is
firmly secured to the cylinder, as can be seen at 15 in
FIG. 1. The inclined slots 17, of which only a few are
shown in FIG. 1, are located above the helical path 14
and run in the direction of circulation of the inner cylin-
drical casing 1 from the bottom to the top as indicated
by the arrow 16. The slots 17 are in the entire surface of
the cylinder 2. The top of cylinder 2 has a ridge provided
with a recess 18 opening into the discharge 19.

A knife frame 3 is arranged outside the cylinder 2 and
consists of a rotatable plate 20 with vertical bars 21 which,
in the embodiments shown, are U-shaped steel, and sup-
porting horizontally arranged annular bands 22, also of
U-shaped steel. A number of knife holders 23 are arranged
directly between the annular bands 22 with each knife
holder holding the knife 24 tangentially against the sta-
tionary cylinder by means of springs 25 which permit the
knife to move outwardly when meeting obstacles such as
pebbles and the like.

The knife frame 3 rotates slightly faster, in the direction
of the arrow 16, than the rotatable inner cylindrical cas-
ing 1. In the embodiment shown, both the knife frame 3
and the inner cylindrical casing 1 are driven by means
of the same electrical motor 26 through the slower running
transfer system 27 for the inner cylindrical casing 1 and
the quicker running transfer system 28 for the knife frame
3. Of course, independent transfer means, such as two sep-
arate electrical motors or other similar driving means may
be used for this purpose.

The entire assembly is preferably enclosed by a casing
29 having a door or doors (not shown) and a cover or
top opening (not shown) for the feeding and discharge
of the onions.

The device operates as follows. A conveyor belt feeds
the onions to the machine where they are discharged from
above into the interior of the inner cylindrical casing 1.
In many cases it may be useful to supply water at 30 at the
same time, which may be sprayed or sprinkled into the
inner cylindrical casing 1 and may further serve as a con-
veyor or means itself for the onions. The onions then fill
the cylindrical casing 1 to more or less considerable height and are pressed by the spiral 13 onto the first part 14a of the helical path 14. Here the checking member 32 cooperates to move the onions onto the helical path.

The onions are now taken along by the elastic pins 6 of the coating 5 on the inner cylindrical casing and moved upwardly along the stationary helical path 14 during which process they continually rotate and are aided in their rotation by checking members 31 arranged on the helical path 14. During the long upward movement along the helical path 14 the head or the tail of the onions will at least once project through the slots 17 in the stationary cylinder 2 so that they may be cut off by the knives 24 rotating with the frame 3. When the onions arrive at the top they are discharged through the recess 18 and the discharge 19, entirely decapitated and tailed and with extremely small waste.

During this operation a water jet may be directed on the outer side of the stationary cylinder 2 or water may be made to run along the outer side of the cylinder 2 in order to accelerate the discharge of the cut off heads and tails.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A machine for decapitating and tailing onions comprising:
   a feeding device;
   a body provided with openings;
   a moving body to feed said onions against said body with openings in such a way that the heads and tails of the onions protrude through said openings;
   means outside said body with openings provided with knives arranged to cut off the heads and tails of said onions which protrude through said openings;
   and a discharge for the decapitated and tailed onions, the improvement comprising
   a vertically arranged rotatable inner cylindrical casing into which onions are introduced;
   elastic pins provided on the outer side surface of said cylindrical casing;
   the underside of said cylindrical casing being provided with a slot shaped aperture;
   a stationary vertically arranged cylinder surrounding and concentric with the rotatable cylindrical casing and closely enclosing said elastic pins for receiving onions from said slot shaped aperture;
   an upwardly extending helical path of slight pitch supported by said stationary cylinder upon which onions moved into the space between the inner cylindrical casing and the stationary cylinder are pushed upwardly by said elastic pins;
   said stationary cylinder further including upwardly extending slots located immediately above said helical path;
   a rotatable knife frame; and
   knives mounted on said knife frame and arranged outside said stationary cylinder for cutting off the heads and tails of the onions which protrude through said slots;
   the top of the stationary cylinder having a recess for the discharge and removal of said processed onions from said machine.

2. The machine of claim 1 wherein said upwardly extending helical path has a length in the order of twenty meters or more.

3. The machine according to claim 1 further including a water supply device arranged outside said stationary cylinder and directed between said stationary cylinder and said knife frame to wash away the cut off heads and tails of said onions.

4. The machine according to claim 1 wherein said rotatable knife frame includes a plurality of knives each separately and resiliently mounted on said frame to reduce knife wear and damage.

5. The machine according to claim 1 wherein both the rotational velocity of the rotatable inner cylindrical casing and the rotatable knife frame are adjustable.

6. The machine according to claim 1 wherein the rotational velocity of the rotatable knife frame is greater than the rotational velocity of the rotatable inner cylindrical casing.

7. The machine according to claim 1 wherein the upwardly extending slots in the stationary cylinder are inclined in such a direction that as the rotatable knife frame is rotated the knives will move from the lower ends of the slots toward the upper ends of the slots.

8. The machine according to claim 1 wherein said upwardly extending helical path includes small check members mounted thereon for increasing the revolving movement of the onions in their upward travel on said path.

9. A machine according to claim 1 wherein said slot shaped aperture in said inner cylindrical casing comprises a spirally bent strip extending from the outer circumference of said casing to its center in a direction such that rotation of the inner cylindrical casing will move onions into the space between the inner cylindrical casing and the stationary cylinder and onto said helical path.

10. The machine according to claim 9 further including a check member on the bottom of said inner cylindrical casing which cooperates with said spirally bent strip to move the onions into the space between said inner cylindrical casing and said stationary cylinder.

References Cited

UNITED STATES PATENTS

| 1,336,991 | 4/1920 | Urchel | 146—86 |
| 3,378,051 | 4/1968 | Grosbety | 146—86 |

DONALD R. SCHRAN, Primary Examiner

Z. R. BILINSKY, Assistant Examiner

U.S. Cl. X.R.

146—86, 93